United States Patent [19]

Nishimura et al.

[11] 4,252,031
[45] Feb. 24, 1981

[54] AUTOMATIC TRANSMISSION

[75] Inventors: Sadanori Nishimura, Omiya; Yoji Yamada, Kawagoe, both of Japan

[73] Assignee: Honda Giken Kogyo Kabushiki Kaisha, Shibuya, Japan

[21] Appl. No.: 933,102

[22] Filed: Aug. 11, 1978

[30] Foreign Application Priority Data

Aug. 15, 1977 [JP] Japan .................. 52-97619
Feb. 1, 1978 [JP] Japan .................. 53-9350

[51] Int. Cl.³ ............................................. F16H 3/08
[52] U.S. Cl. .................................. 74/360; 74/364; 74/606 R; 192/87.13; 192/113 B
[58] Field of Search .............. 74/335, 336 R, 336.5, 74/357, 358, 359, 360, 606 R, 606 A, 364; 192/85 A, 85 AA, 87.11, 113 B, 87.13

[56] References Cited

U.S. PATENT DOCUMENTS

| 651,238 | 6/1900 | Crouan | 74/359 |
|---|---|---|---|
| 2,231,411 | 2/1941 | Lawrence | 192/87.11 X |
| 2,887,199 | 5/1959 | Funk | 74/364 |
| 2,924,983 | 2/1960 | Curran | 74/364 |
| 2,970,498 | 2/1961 | Murray et al. | 74/336.5 X |
| 3,162,063 | 12/1964 | Konrad | 192/85 AA X |
| 3,301,367 | 1/1967 | Yokel | 192/113 B |
| 3,393,586 | 7/1968 | Zundel | 74/336.5 X |
| 3,464,277 | 9/1969 | Longshore | 74/335 |
| 3,823,802 | 7/1974 | Winzeler et al. | 192/113 B |

FOREIGN PATENT DOCUMENTS 751607 7/1956 United Kingdom ................ 74/364

Primary Examiner—Lawrence J. Staab
Attorney, Agent, or Firm—Haseltine and Lake

[57] ABSTRACT

An automatic transmission comprising a plurality of speed-change hydraulic clutches selectively operated in dependence of various speeds separately carried by an input shaft and an output shaft, and wherein working oil is supplied from a hydraulic oil source to the hydraulic clutches through (a) fixed oil passages provided in a casing, (b) conduction pipes arranged in coaxially spaced relation within one another in a central bore in the input shaft and/or the output shaft, and (c) communicating passages formed in the input shaft and/or output shaft and connected to the hydraulic clutches. The conduction pipes are respectively connected at one end with the fixed oil passages in a fixed or pivotal manner and at the other end with the communicating passages with seals arranged between the outer peripheries thereof and the inner periphery of the bore in the shaft.

12 Claims, 6 Drawing Figures

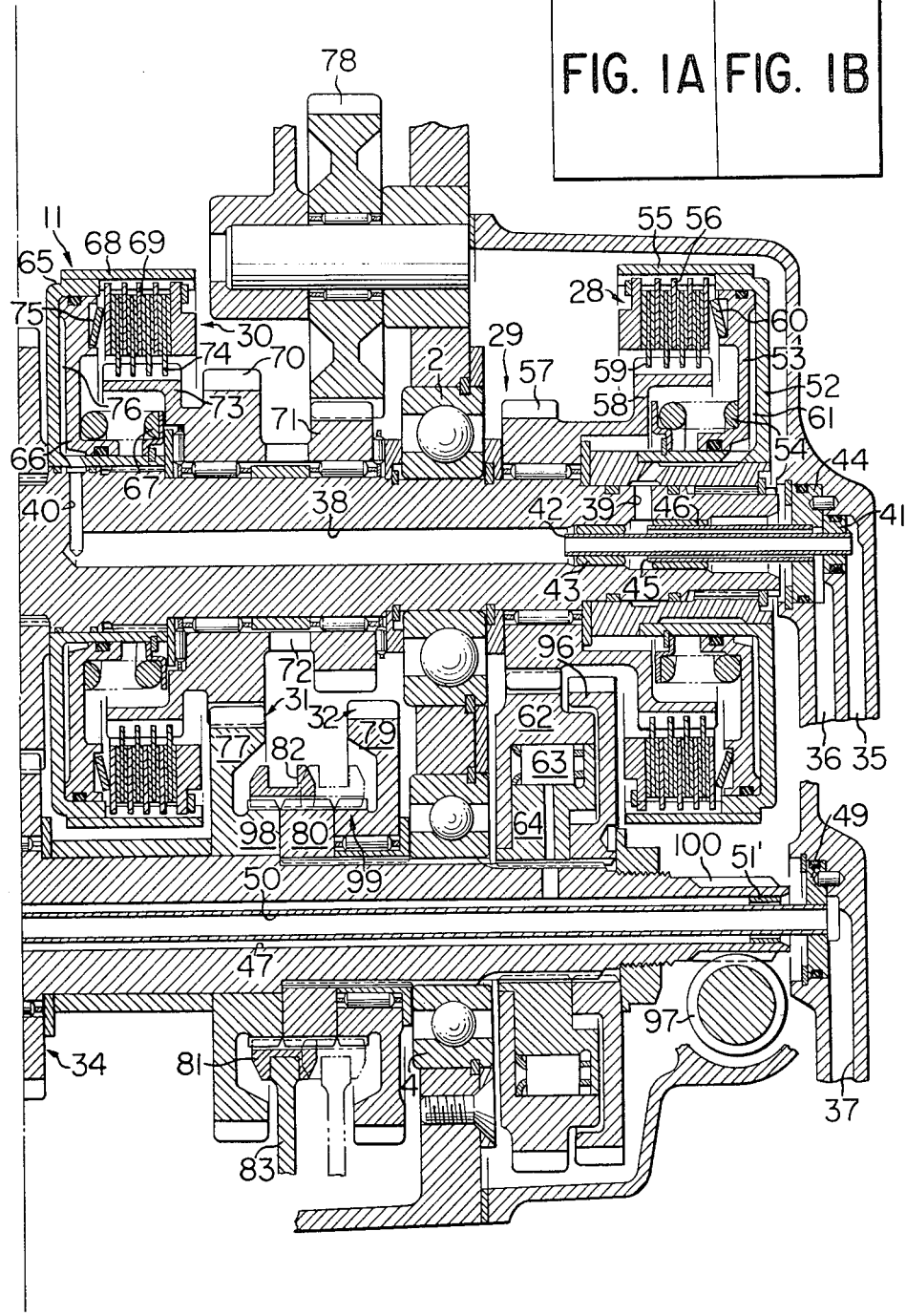
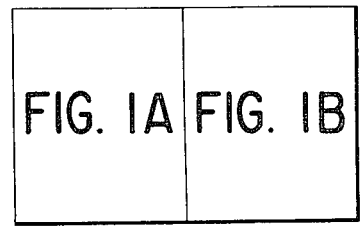

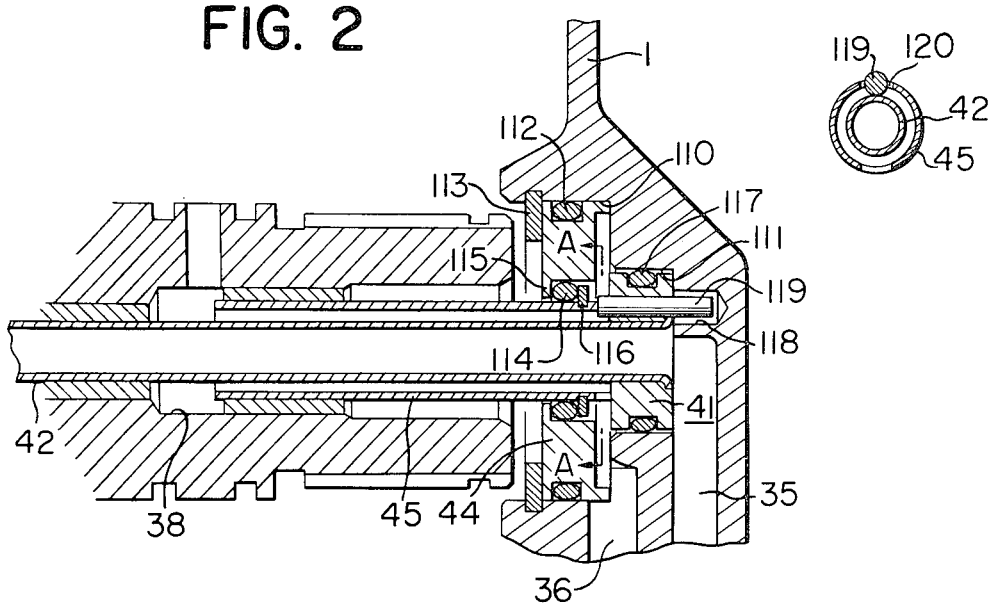
FIG. 2
FIG. 2a
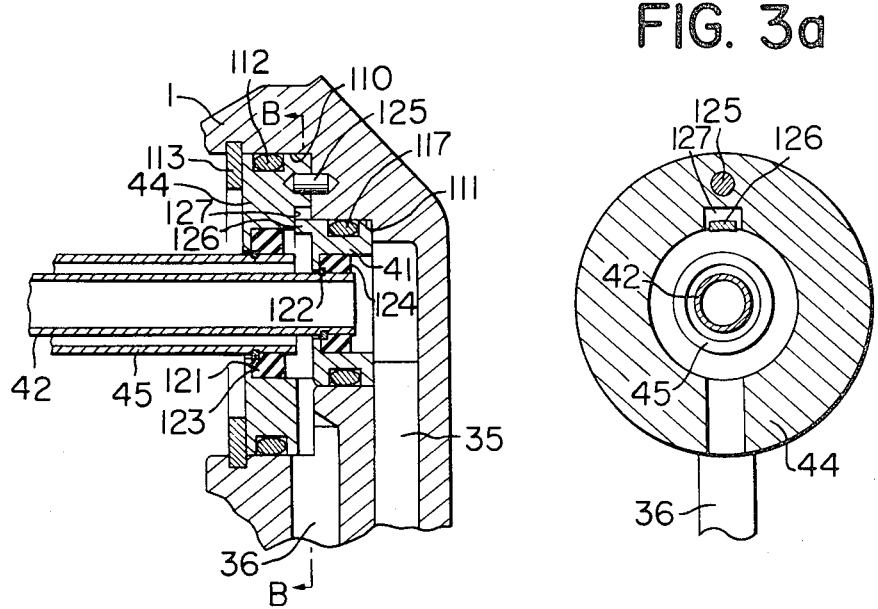
FIG. 3
FIG. 3a

AUTOMATIC TRANSMISSION

BACKGROUND OF THE INVENTION

1. Field of the Invention

The present invention relates to a multi-stage type transmission in which a plurality of speed-change hydraulic devices selectively operable in sequence depending upon various speeds are carried by an input shaft and an output shaft, and in which fluid supply lines for feeding pressure fluid from a pressure source to the clutch devices are connected between rotatable and non-rotatable parts without the use of any members which are disposed in axial alignment and in frictional contact with one another.

2. Description of the Prior Art

Generally speaking, the transmission efficiency of an automatic transmission is lower than that of a manual transmission, and the size of the external configuration of the automatic transmission is greater than that of the manual transmission required to obtain substantially the same output. Particularly, when the automatic transmission is employed in FF or RR type automobiles in which the output shaft as well as the crank shaft of the engine are arranged laterally of the vehicle, the automatic transmission is normally installed within an engine compartment of limited available space. For this reason, an increase in transmission efficiency and reduction in weight and size are very important.

In conventional multi-stage type automatic transmissions, the axial length of the transmission had to be extended and greater external size thereof had to be used for the convenience of arrangement of the speed change gearing or clutches within the casing, and therefore, particular consideration had to be given to the employment thereof. In order to actuate various clutch devices disposed within the casing of the multi-stage type automatic transmission, fluids for actuating the clutches must be fed through a connection in a flow passage between a rotatable part of the side of the rotating shaft and a non-rotatable part on the side of the casing. In the conventional multi-stage automatic transmissions, however, at least two seal rings are required for each flow passage in the connection between the rotatable part and non-rotatable part which calls for additional axial length on opposite sides of the seal rings for mounting thereof, and the need for a minimal clearance between the rotatable part and the non-rotatable part to allow relative rotation therebetween. Additionally, the axial length of the multi-stage automatic transmission had to be further increased.

Furthermore, in the conventional multi-stage automatic transmissions, the axial force exerted on each seal ring when the working fluid is fed to each clutch device produces frictional contact between the rotatable part and the non-rotatable part, resulting in a loss of power. This loss of power results in a significant decrease in transmission efficiency. Also, the seal ring is cut at one place thereof for the convenience of its mounting into a mounting groove. However, leakage of fluid in the cut section occurs to an extent which is not negligible, and hence the fluid pump must be increased in capacity in order to compensate for the leakage of the fluid, unavoidably resulting in the decrease in efficiency of the multi-stage automatic transmission and increase in size and weight thereof.

SUMMARY OF THE INVENTION

It is an object of the present invention to provide a multi-stage automatic transmission which is small in overall size, light-weight, low in power loss and leakage of fluid and can be operated extremely efficiently.

In accordance with the present invention, there is provided an automatic transmission including a casing provided with fixed oil passages in communication with a hydraulic source, an input shaft rotatably supported in the casing, an output shaft rotatably supported in the casing parallel to the input shaft, speed change gear means for effecting power transmission between the input shaft and the output shaft, and hydraulic clutch means disposed on the input shaft and/or the shaft and communicating with the fixed oil passages to actuate the speed change gear means, the improvement comprising a central bore formed in the input shaft and/or the output shaft along the axis thereof, the bore in the shaft having one open end, conduction pipe means disposed within the bore in the shaft, the conduction pipe means having one end connected at the open end of the bore in the shaft to the fixed passage disposed in the casing and the other end supported within the bore in the shaft through seal means, and communicating passages drilled in the input shaft and/or the output shaft in axially spaced relation with each other and placed in communication with the conduction pipe means and the hydraulic clutch devices.

BRIEF DESCRIPTION OF THE DRAWINGS

FIG. 1 is a view showing the association of FIGS. 1A and 1B with each other.

FIG. 1B is a longitudinal section of the other half of the transmission.

FIG. 2 is an enlarged longitudinal sectional view showing a modified form of a major part thereof.

FIG. 2a is a sectional view taken along line A—A in FIG. 2;

FIG. 3 is an enlarged sectional view showing a further modified form of the part in FIG. 2.

FIG. 3a is a sectional view taken along line B—B in FIG. 3.

DESCRIPTION OF THE PREFERRED EMBODIMENTS

Figure 1A:
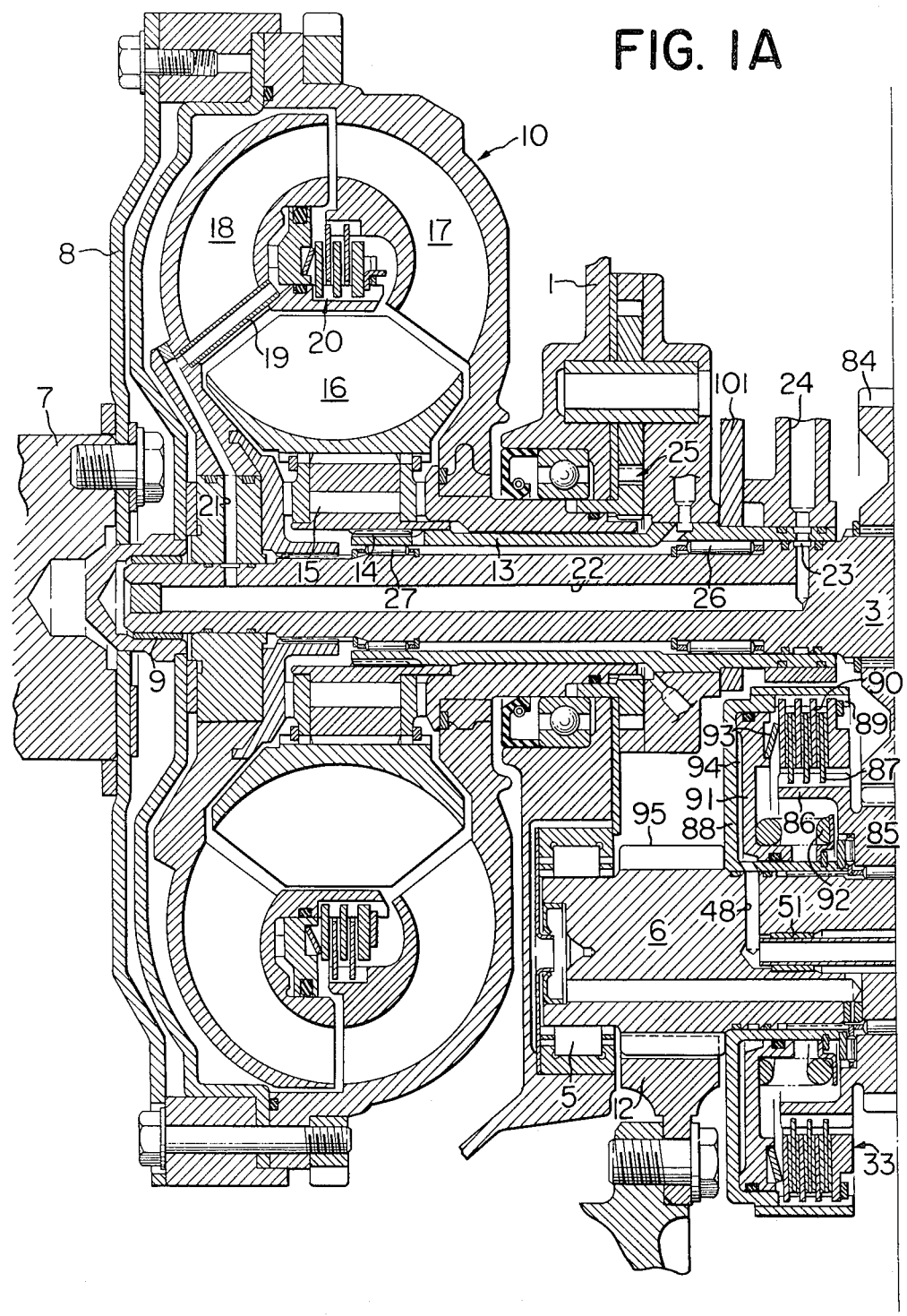
FIG. 1A is a longitudinal section of one-half of a multi-stage type automatic transmission in accordance with the present invention.

One embodiment of the present invention will now be described with reference to the drawings.

Referring to FIGS. 1A and 1B there is shown a transmission generally designated at 11, axially adjacent a fluid type torque converter 10 connected to a crank shaft 7 of an engine. An input shaft 3 and an output shaft 6 are rotatably supported, in parallel relation with each other, in a casing 1 of the transmission 11 by means of bearings 2, 9 and bearings 4, 5, respectively. The output of the engine is transmitted to the fluid type torque converter 10 through the crank shaft 7 and the output of the fluid type torque converter 10 is transmitted to the input shaft 3 of the transmission 11. The output of the transmission 11 is transmitted from the output shaft 6 to an input gear 12 of a differential through a gear 95 formed on the output shaft 6. The fluid type torque converter 10 comprises a stator 16 mounted by a spline 14 and a one-way clutch 15 on a stator shaft 13 which surrounds the input shaft 3 through bearings 26, 27 and is supported on the casing 1 rotatably through a small angle, a pump 17 which is connected to the crank shaft 7 through a rotatable plate 8 relatively rotatably supporting one end of the input shaft 3 through the bearing 9 and drives a fluid pressure generator 25 such as a gear pump, and a turbine 18 fixed on the input shaft 3 and rotated by fluids discharged from the pump 17 to rotate and drive the input shaft 3. Pressure fluid produced by the fluid pressure generator 25 partly passes through a flow passage 24, an annular groove 23 formed in an outer peripheral surface of the input shaft 3, a flow passage 22 formed in the input shaft 3, a flow passage 21 and a flow passage 19 to actuate a direct clutch 20 disposed between the pump 17 and the turbine 18. Pressure fluid produced by the fluid pressure generator 25 and controlled in pressure, in response to turning of a lever 101, is partly further fed to change-over control valve (not shown). This change-over control valves selectively feed the fluid in a preset control mode to a first clutch operating-fluid flow passage 35, a second clutch operating-fluid flow passage 36 or a third clutch operating-fluid flow passage 37, these passages being formed in the casing.

The transmission 11 has a low speed stage speed-change gear 29 operated by a low speed clutch 28 carried by the input shaft 3, a medium speed stage speed-change gear 31 and a reverse speed change gear 32 operated by a medium speed clutch 30 similarly carried by the input shaft 3, and a high speed stage speed-change gear 34 operated by a high speed clutch 33 carried by the output shaft 6.

The input shaft 3 is formed along the axis thereof with a central bore 38 opening at one end of the input shaft 3. A first inner conduction pipe 42 communicating with the first clutch operating-fluid flow passage 35 has a base end secured at its outer peripheral portion to the casing 1 through a fixing member or annular supporting plate 41. The inner conduction pipe 42 extends through the open end of the bore 38 and is relatively rotatably supported at an outer peripheral portion at the other end thereof on the inner peripheral surface of the bore 38 through a seal member 43. A second outer conduction pipe 45, which is shorter than the inner conduction pipe 42, surrounds the inner conduction pipe 42 so as to form an annular clearance therebetween. The pipe 45 has its base end secured at an outer peripheral portion thereof to the casing 1 through a fixing member or annular supporting plate 44 and is placed in communication with the second clutch operating-fluid flow passage 36. Additionally, the outer conduction pipe 45 has its foremost end relatively rotatably supported, at a position axially retracted from the foremost end of the inner conduction pipe 42, at an outer peripheral portion thereof on the inner peripheral surface of the bore 38 through a seal member 46. The input shaft 3 is formed with a communicating hole or passage 39 and a communicating hole or passage 40, the hole 39 being provided to convey fluid introduced into the bore 38 through the annular clearance between the inner and outer conduction pipes 42 and 45 to the low speed clutch 28, the hole 40 being provided to convey the fluid introduced into the bore 38 through the interior of the inner conduction pipe 42 to the medium speed clutch 30.

The output shaft 6 is formed with a bore 47 opening at one end of the output shaft 6. A third conduction pipe 50 axially extends through an annular lubricating oil retainer member 51' disposed in the open end of the bore 47 and pipe 50 has its base end secured at an outer peripheral portion thereof to the casing 1 through a fixing member or supporting plate 49. The pipe 50 is placed in communication with the passage 37 for the third clutch. The conduction pipe 50 has its foremost end relatively rotatably supported on the inner peripheral surface of the bore 47 through a seal member 51. The output shaft 6 is formed with a flow passage 48 to convey fluid introduced into the bore 47 through the interior of the conduction pipe 50 to the high speed clutch 33.

The low speed clutch device 28 has a cylinder 52 secured to the input shaft 3, a piston 53 in co-operation with the cylinder 52 to form a cylinder chamber 61, a multi-clutch plate 56 supported by an outer cylindrical body 55 secured to an outer peripheral edge of the cylinder 52, and a multi-clutch plate 59 supported for alternate engagement with the multi-clutch plate 56 by an inner cylindrical body 58 integral with a gear 57 rotatably supported on the input shaft 3. The low speed stage speed-change gear device 29 comprises the gear 57, a torque transmitting ring 64 spline-connected to the output shaft 6, and a gear 62 fitted on an outer peripheral surface of the torque transmitting ring 64 through a one-way clutch 63 and placed in engagement with the gear 57 on the input shaft 3.

When fluid is introduced into the cylinder chamber 61 through the communicating hole 39, the piston 53 moves against the biasing force of a compressed spring 54 to press through a belleville spring 60 in the multi-clutch plates 56 and 59 into friction engagement with each other. In this manner, when the low speed clutch device 28 is operated, the turning force of the input shaft 3 is transmitted to the output shaft 6 through the low speed clutch 28, the gear 57, the gear 62, the one-way clutch 63 and the torque transmitting ring 64.

The medium speed clutch device 30 has a cylinder 65 secured to the input shaft 3, a piston 66 in cooperation with the cylinder 65 to form a cylinder chamber 76, a multi-clutch plate 69 supported by an outer cylindrical body 68 secured to an outer peripheral edge of the cylinder 65, and a multi-clutch plate 74 supported for alternate engagement with the multi-clutch plate 69 by an inner cylindrical body 73 integral with a gear 70 rotatably supported on the input shaft 3. The medium speed stage speed-change gear device 31 comprises the gear 70, a gear 77 rotatably supported on the output shaft 6 for engagement with gear 70, and a gear 98 integral with the gear 77. The reverse speed-change gear device 32 has a gear 71 rotatably supported on the input shaft 3 and integrally connected to the gear 70 through an interlock means 72, an intermediate gear 78, which is shown at a position different from the actual position for the convenience of illustration, in engagement with the gear 71, a reverse gear 79 rotatably supported on the output shaft 6 for engagement with the intermediate gear 78, and a gear 99 integral with the reverse gear 79 having the same pitch circle radius as that of the gear 98. A gear 80, whose pitch circle radius is the same as that of the gears 98 and 99 and which is secured to the output shaft 6, is interposed between the gear 98 and gear 99. There is also provided a gear selector 81, which selectively connects the gear 80 with the gears 98 and 99, so that when a fork 83 engaged in an annular groove 82 formed in the outer peripheral surface of the gear selector 81 is operated, the gear selector 81 may be axially moved between a position indicated by the solid lines in which the gear 98 and the gear 80 are integrally rotated and a position indicated by the chain lines in which the gear 99 and the gear 80 are integrally rotated.

When fluid is introduced into the cylinder chamber 76 through the communicating hole 40, the piston 66 moves against the biasing force of a compression spring 67 to press, through a belleville spring 76, the multi-clutch plates 69 and 74 into friction engagement with each other. In this manner, when the medium speed clutch device 30 is operated, the turning force of the input shaft 3 is transmitted, when the gear selector 81 is in the position as indicated by the solid lines in FIG. 1B, to the output shaft 6 through the medium speed clutch device 30, the gear 70, the gear 77, the gear 98, the gear selector 81 and the gear 80. Further, when the gear selector 81 is in the position as indicated by the chain lines in FIG. 1B, the turning force of the input shaft 3 is transmitted to the output shaft 6 through the medium speed clutch device 30, the gear 70, the interlocking means 72, the gear 71, the intermediate gear 78, the reverse gear 79, the gear 99, the gear selector 81 and the gear 80.

The high speed stage speed-change clutch device 33 has a cylinder 88 secured to the output shaft 6, a piston 91 in cooperation with the cylinder 88 to form a cylinder chamber 94, a multi-clutch plate 90 supported by an outer cylindrical body 89 secured to the outer peripheral edge of the cylinder 88, and a multi-clutch plate 87 supported for alternate engagement with the multi-clutch plate 90 by an inner cylindrical body 86 integral with a gear 85 supported rotatably on the output shaft 6. The high speed stage speed-change gearing 34 comprises the gear 85 and a gear 84 which is supported on the input shaft 3 for integral rotation with the input shaft 3.

When fluid is introduced into the cylinder chamber 94 through the flow passage 48, the piston 91 moves against the biasing force of a compression spring 92 to press the multi-clutch plates 90 and 87 into friction engagement with each other through a belleville spring 93. In this manner, when the high speed clutch device 33 is operated, the turning force of the input shaft 3 is transmitted to the output shaft 6 through the gear 84, the gear 85 and the high speed clutch device 33.

The output shaft 6 has an anti-rotation gear 96 supported thereon for integral rotation therewith, the gear 96 being brought into engagement with an anti-rotation pawl (not shown) as the latter is rotated in case the transmission 11 need be stopped. The output shaft 6 further has at its end a screw gear 100, which is in mesh with a speed detecting gear 97 for driving a signal generator used to control shifting of the change-over control valves.

FIGS. 2 and 2a show a modification in which the above-mentioned inner and outer conduction pipes 42, 45 in the form of a dual pipe construction are supported tiltably with respect to the casing 1. In this modification, the casing is provided with a large diameter recess 110 in communication with the second fixed oil passage or the second clutch operating-fluid oil passage 36 and a small diameter recess 111 in communication with the first fixed oil passage or the first clutch operating-fluid oil passage 35, the recesses 110 and 111 being axially spaced from each other and opposing the opening end of the bore 38 in the input shaft 3. The outer conduction pipe 45 is tiltably supported, through an inner O-ring 114, in the inner periphery of the large-diameter annular supporting plate 44 closely fitted in the large diameter recess 110 through an outer O-ring 112 and locked by a detent ring 113, the inner O-ring 114 being locked by an inner projection 115 at the inner peripheral surface of the large-diameter annular supporting plate 44 and a detent ring 116 mounted on the outer conduction pipe 45. The small-diameter annular supporting plate 41, whose inner peripheral surface is secured to the outer peripheral surface of the inner conduction pipe 42 by press-fitting, welding or the like, is tiltably fitted in the small diameter recess 111 through a resilient O-ring 117 leaving a small clearance between the outer peripheral surface of the supporting plate 41 and the inner peripheral surface of the small diameter recess 111. Extending through the small-diameter annular supporting plate 41 is a detent pin 119 loosely fitted at one end in a locking hole 118 bored in the casing 1, the other end of the detent pin 119 being engaged in a notch 120 formed in the outer conduction pipe 45, whereby the inner and outer conduction pipes 42 and 45 are prevented from rotational movement.

FIGS. 3 and 3a show a further modification in which the inner and outer conduction pipes 42 and 45 are tiltably supported with respect to the casing 1. In this modification, the large and small diameter annular supporting plates 44 and 41 are respectively closely fitted in the large diameter recess 110 and the small diameter recess 111 axially formed in the casing 1 in a two-stage fashion through the O-rings 112 and 117 disposed on the outer peripheral surfaces thereof. The outer and inner conduction pipes 45 and 42 are tiltably supported by the large and small diameter annular supporting plates 44 and 41 through resilient seal members 123 and 124 which are secured on the outer and inner conduction pipes 45 and 42, for example, by heating and the seal members are locked by detent rings 121 and 122, respectively. The large diameter annular supporting plate 44 has one end locked by the detent ring 113 whereas the other end thereof is non-rotatably supported on the casing 1 by a detent pin 125. The small-diameter annular supporting plate 41 has one end integrally formed with an engageable projection 126, which engages in a recess 127 in an adjacent end of the large-diameter supporting plate 44 so that the small-diameter annular supporting plate 41 is held against rotation through the large-diameter annular supporting plate 44.

With the foregoing construction, the fluid fed from the fluid pressure generator 25 to the change-over control valves is selectively distributed, in accordance with a predetermined control mode into the first clutch operating-fluid flow passage 35, the second clutch operating-fluid flow passage 36 or the third clutch operating-fluid flow passage 37. When the change-over control valves are in a position of low speed, the fluid is fed to the second clutch operating-fluid flow passage 36 and flows into the bore 38 passing through the annular clearance between the inner conduction pipe 42 and the outer conduction pipe 45 and then into the communicating hole 39 to actuate the low speed clutch device 28. At this time, both the medium speed clutch device 30 and the high speed clutch device 33 are in a released state so that the turning force of the input shaft 3 is transmitted to the output shaft 6 through the low speed stage speed-change gearing 29.

When the change-over control valves are in a position of medium speed, the fluid is fed to the first clutch operating-fluid flow passage 35, and thereafter into the bore 38 passing through the inner conduction pipe 42 and then into the cylinder chamber 76 through the communicating hole 40 to actuate the medium speed clutch device 30. At this time, since the low speed clutch device 28 is released or if engaged, one-way clutch 63 is released and at the same time the high speed clutch device 33 is in a released state, the turning force of the input shaft 3 is transmitted to the output shaft 6 through the medium speed stage speed-change gearing 31 because the gear selector 81 is in the position indicated by the solid lines in FIG. 1B. Further, when the change-over control valves are in a position of high speed, the flow is fed to the third clutch operating-fluid flow passage 37, and thereafter into the bore 47 passing through the conduction pipe 50 and then into the cylinder chamber 94 through the communicating passage 48 to actuate the high speed clutch device 33. At this time, since the low speed clutch device 28 is released or if engaged, one-way clutch 63 is released and at the same time the medium speed clutch device 30 is in a released state, the turning force of the input shaft 3 is transmitted to the output shaft 6 through the high speed stage speed-change gearing 34.

When the change-over control valves are in a position of reverse speed, the fluid actuates the medium speed clutch device 30 in a manner similar to that of the medium speed stage. Also in this case, both the low speed clutch device 28 and the high speed clutch device 33 are in a released state and the gear selector 81 is displaced to the chain-line position in FIG. 1B. Hence, the turning force of the input shaft 3 is transmitted to the output shaft 6 through the reverse speed-change gearing 32.

While the reverse speed-change gearing 32 is interlocked with the medium speed stage speed-change gearing 31 through the interlocking device 72 in the abovementioned embodiment, it should be noted that the gearing 32 may be designed so that it is interlocked with the low speed stage speed-change gearing 29 through other suitable interlocking means. In place of the arrangement wherein the fluid is fed to the low speed clutch device 28 through the communicating hole 39 and the fluid is fed into the medium speed clutch device 30 through the communicating hole 40, the fluid could be fed to the medium speed clutch device 30 through the communicating hole 39, to the low speed clutch device 28 through the communicating hole 40. In this case, it is necessary that when the change-over control valves are in a position of low speed, the fluid is fed to the first clutch operating-fluid flow passage 35, and when the change-over control valves are in a position of medium speed, the fluid is fed to the second clutch operating-fluid flow passage 36.

While, in the abovementioned embodiment, the communicating holes 39 and 40 in communication with the first and second hhdraulic clutch devices 28 and 30 have been individually brought into communication with the second and first clutch operating-fluid oil passages 36 and 35 formed in the casing 1 through the dual pipe composed of the inner and outer conduction pipes 42 and 45, the construction may be such that additional hydraulic clutch devices may be mounted on the input shaft 3 and/or the output shaft 6 and communicating holes and clutch operating-fluid oil passages corresponding in number thereto are incorporated in the input shaft 3 and/or the output shaft 6 and the casing 1, whereby these communicating holes are individually brought into communication with the clutch operating-fluid oil passages through a multi-pipe arrangement within the bores 38 and/or 47.

As described above, in accordance with the present invention, the supply of working oil from the fixed oil passages formed in the casing and connected to the hydraulic source and to the hydraulic clutch devices adapted to actuate the speed change gearings for effecting power transmission may be carried out through the conduction pipe means arranged within the bore in the input shaft and/or output shaft along the axis thereof, said conduction pipe means having one end connected to the fixed passage disposed in the casing at the open end of the bore and the other end supported within the bore by the seal member, the communicating holes drilled in the input shaft and/or output shaft being axially spaced apart from each other and placed in communication with the conduction pipe means and the hydraulic clutch devices. Accordingly, sealing between rotating and non-rotating parts is effected between the bore in the shaft and the conduction pipe means inserted therein and as a result, the axial dimensions may be substantially decreased as compared to the automatic transmissions of the prior art. In addition, the sealing members become reduced in diameter as compared to the case where they are arranged about the outer periphery of the input and/or output shafts to thereby reduce the contact area therebetween and decrease friction loss during the power transmission, thus preventing a decrease in efficiency of the power transfer in the transmission. Moreover, since the peripheral speed of the contact area in the sealing member is also reduced, the wear on the sealing member is decreased to minimize leakage of oil through the sealing portion thereby increasing the operating efficiency of the speed change gear.

Since the conduction pipe means in the present invention comprises a multi-pipe arrangement in which a plurality of conduction pipes are placed one in the other, this arrangement reduces the axial dimensions as compared to the case where a plurality of single pipes are axially arranged in a line and also simplifies mounting. Additionally, sealing of connections between the conduction pipe means and the fixed oil passages may be achieved in the vicinity of the opening end of the bore in the shaft in a simple manner.

In addition, in the case where the conduction pipe means and the fixed oil passages formed in the casing are connected for relative tilting movement, even if the center of the input shaft and/or output shaft is not in coincidence with the center of the conduction pipe means received therein, the conduction pipe means may readily follow the rotation of the input shaft and/or output shaft, as a consequence of which there is produced no one-sided wear in the sealing member. Moreover, since minor misalignment between the center of the bore in the input shaft and/or output shaft and the center of the conduction pipe means is allowed, these components may be more readily machined and assembled.

Moreover, with the arrangement wherein the input shaft and the output shaft are disposed in parallel to each other, the low speed clutch device and the medium speed clutch device are disposed on the input shaft, and the high speed clutch device is disposed on the output shaft, the entire apparatus can be reduced in axial length and the external configuration can be reduced in size. In addition, the connections between the clutch operating-fluid flow passages formed in the casing and the communicating passages formed through the input and output shafts are effected by means of the conduction pipes, which are arranged in the bores in the input and output shaft and which have their base ends secured to the casing and their foremost ends rotatably supported in the bores with seal means arranged around the outer peripheries thereof for sealing in an axial direction. This results in the following advantages: namely, it is unnecessary to use two seal rings as required in the prior art and in spite of this, it is possible to effectively prevent leakage of fluid; even in case of a multi-speed stage transmission, the axial length thereof can be made relatively short. Further, the interlocking of the reverse speed-change gearing with the low speed stage speed-change gearing or the medium speed stage speed-change gearing in conjunction with the gear selector provides a multi-stage automatic transmission, which is reduced in overall size, is light-weight, has lower power loss and leakage of fluid, and can be operated extremely efficiently.

What is claimed is:

1. An automatic transmission comprising a casing provided with a plurality of fixed oil passages in communication with a hydraulic source, an input shaft rotatably supported in said casing, an output shaft rotatably supported in said casing parallel to said input shaft, speed change gear means for effecting power transmission between said input shaft and said output shaft, hydraulic clutch means disposed on at least one of said shafts and communicating with said fixed oil passages to actuate said speed change gear means, at least one of said shafts being provided with a bore along the axis thereof, said bore having one open end, conduction pipe means disposed within said bore, coupling means supporting one end of said conduction pipe means at the open end of said bore to couple said conduction pipe means and one of said fixed oil passages for relative pivotal movement, and seal means supporting the other end of the conduction pipe means within said bore, said one shaft being provided with at least one communicating passages in communication with said conduction pipe means and with said hydraulic clutch means.

2. An automatic transmission as claimed in claim 1, wherein said seal means comprises annular seal members interposed between the outer periphery of said conduction pipe means and the inner periphery of said bore in the shaft.

3. An automatic transmission as claimed in claim 1, wherein said conduction pipe means comprises a single conduction pipe which is pivotally supported by a resilient seal member arranged between said pipe and said casing.

4. An automatic transmission as claimed in claim 3, wherein said casing has a recess formed therein in facing relation in the open end of said shaft bore; said coupling means comprises a supporting plate; and said resilient seal member is disposed between said supporting plate and at least one of said recess and said conduction pipe.

5. An automatic transmission as claimed in claim 4, wherein said seal means comprises an annular bush having an axially elongated annular inner surface, there being a small clearance between said inner surface of said bush and the outer surface of said conduction pipe, and wherein said conduction pipe is of axial length larger than the diameter thereof and has a limited thickness.

6. An automatic transmission comprising a casing, an input shaft and an output shaft rotatably supported in said casing in parallel relation to each other; a low speed stage speed-change gearing, a medium speed stage speed-change gearing, a reverse speed change gearing and a high speed stage speed-change gearing, said gearings each effecting power transmission between said input shaft and said output shaft; a low speed clutch means disposed on said input shaft, for actuating said low speed stage speed-change gearing; a medium speed clutch means disposed on said input shaft for actuating said medium speed stage speed-change gearing; interlocking means for selectively bringing said reverse speed change gearing into interlocking relation with one of said low speed stage speed-change gearing and said medium speed stage speed-change gearing; a high speed clutch means disposed on said output shaft for actuating said high speed stage speed-change gearing; a gear selector for selectively transmitting output of either the gearing in interlocking relation with said reverse speed change gearing or said reverse speed-change gearing to said output shaft when both the gearing in interlocking relation with said reverse speed-change gearing and said reverse speed-change gearing are actuated; said input shaft having an axial bore therein which opens at one end of said input shaft; a first inner conduction pipe axially extending through the open end of the bore in said input shaft, said inner conduction pipe having a base end secured at the outer peripheral portion thereof to said casing and being in communication with a first clutch operating-fluid flow passage provided in said casing, said inner conduction pipe having a foremost end, first seal means rotatably supporting said foremost end of said inner pipe against the inner peripheral surface of the bore in said input shaft in an axially sealed state; a second outer conduction pipe which is shorter than said inner conduction pipe and surrounds said inner conduction pipe to form an annular clearance between said inner and outer conduction pipes, said outer conduction pipe having a base end secured at the outer peripheral portion thereof to said casing and communicating with a second clutch operating-fluid flow passage provided in said casing, said outer conduction pipe having a foremost end, second seal means rotatably supporting said foremost end of said outer pipe against the inner peripheral surface of the bore in said input shaft, at a position axially retracted from said foremost end of said inner conduction pipe, in an axially sealed state; said input shaft being provided with a first communicating passage for flow of fluid introduced into said bore in said input shaft through said inner conduction pipe to one of said low speed and medium speed clutch means; said input shaft being provided with a second communicating passage for flow of the fluid introduced into the bore in said input shaft through the clearance between said inner and outer conduction pipes to the other of said low speed and medium speed clutch means, said output shaft having an axial bore therein which opens at one end of said output shaft; a third conduction pipe axially extending through the opening in said bore in said output shaft, said third conduction pipe having a base end secured at the outer peripheral portion thereof to said casing and communicating with a third clutch operating-fluid flow passage provided in said casting, said third conduction pipe having a foremost end, and third seal means rotatably supporting said third pipe against the inner peripheral surface of the bore in said output shaft in an axially sealed state, said output shaft being provided with a third communicating passage for flow of fluid introduced into said bore in said output shaft through the interior of said third conduction pipe to said high speed clutch means.

7. An automatic transmission as claimed in claim 6 wherein said input shaft is rotated upon receipt of output from a fluid torque converter driven by a prime mover, and pressure fluid generated by a fluid pressure generator driven along with a pump of said fluid type torque converter is selectively supplied to at least one of said first, second or third clutch operating-fluid flow passage.

8. An automatic transmission as claimed in claim 6, wherein both the bores in the input and output shafts open towards an end wall on the same side of said casing.

9. An automatic transmission as claimed in claim 6, comprising an anti-rotation gear on said output shaft adapted to engage an anti-rotation pawl when the shaft is to be stopped, and speed detecting means coupled in interlocking relation with said output shaft.

10. An automatic transmission comprising a casing provided with a plurality of fixed oil passages in communication with a hydraulic source, an input shaft rotatably supported in said casing, an output shaft rotatably supported in said casing parallel to said input shaft, speed change gear means for effecting power transmission between said input shaft and said output shaft, hydraulic clutch means disposed on at least one of said shafts and communicating with said fixed oil passages to actuate said speed change gear means, at least one of said shafts being provided with a bore along the axis thereof, said bore having one open end, conduction pipe means disposed within said bore, coupling means supporting one end of said conduction pipe means at the open end of said bore to couple said conduction pipe means. and one of said fixed oil passages for relative pivotal movement, and seal means supporting the other end of the conduction pipe means within said bore, said one shaft being provided with at least one communicating passages in communication with said conduction pipe means and with said hydraulic clutch means, wherein said casing is provided with a plurality of recesses at the open end of said bore in said shaft in axially spaced relation from one another, said conductive pipe means including a plurality of conduction pipes arranged coaxially within one another in said bore, said means coupling the conduction pipe means and said fixed oil passages comprising a plurality of supporting plates tiltably fitted in said recesses and respectively secured to the outer peripheries of said conduction pipes at said one end, said conduction pipes providing respective communication between said fixed oil passages and said communicating passages through the hollow interior of the innermost conduction pipe and the annular clearance formed between adjacent inner and outer conduction pipes.

11. An automatic transmission comprising a casing provided with a plurality of fixed oil passages in communication with a hydraulic source, an input shaft rotatably supported in said casing, an output shaft rotatably supported in said casing parallel to said input shaft, speed change gear means for effecting power transmission between said input shaft and said output shaft, hydraulic clutch means disposed on at least one of said shafts and communicating with said fixed oil passages to actuate said speed change gear means, at least one of said shafts being provided with a bore along the axis thereof, said bore having one open end, conduction pipe means disposed within said bore, coupling means supporting one end of said conduction pipe means at the open end of said bore to couple said conduction pipe means and one of said fixed oil passages for relative pivotal movement, and seal means supporting the other end of the conduction pipe means within said bore, said one shaft being provided with at least one communicating passages in communication with said conduction pipe means and with said hydraulic clutch means, wherein said casing is provided with a plurality of recesses at the open end of said bore in said shaft in axially spaced relation from one another, said conduction pipe means including a plurality of conduction pipes arranged coaxially one within the other in said bore, said means coupling the conduction pipe means and said fixed oil passages comprising resilient seal members and a plurality of supporting plates closely fitted in said recesses and tiltably supporting said conduction pipes at said one ends thereof through said resilient seal members, said conduction pipes providing respective communication between said fixed oil passages and said communicating passage through the hollow of the innermost conduction pipe and the annular clearance formed between adjacent inner and outer conduction pipes.

12. An automatic transmission comprising a casing provided with a plurality of fixed oil passages in communication with a hydraulic source, an input shaft rotatably supported in said casing, an output shaft rotatably supported in said casing parallel to said input shaft, speed change gear means for effecting power transmission between said input shaft and said output shaft, hydraulic clutch means disposed on at least one of said shafts and communicating with said fixed oil passages to actuate said speed change gear means, at least one of said shafts being provided with a bore along the axis thereof, said bore having one open end, conduction pipe means disposed within said bore, coupling means supporting one end of said conduction pipe means at the open end of said bore to couple said conduction pipe means and one of said fixed oil passages for relative pivotal movement, and seal means supporting the other end of the conduction pipe means within said bore, said one shaft being provided with at least one communicating passages in communication with said conduction pipe means and with said hydraulic clutch means, wherein said casing is provided with a plurality of recesses at the open end of said bore in said shaft in axially spaced relation from one another, said conduction pipe means including a plurality of conduction pipes arranged coaxially one within the other in said bore, said means coupling the conduction pipe means and said fixed oil passages comprising resilient seal members and a plurality of supporting plates tiltably supporting said conduction pipes at said one ends thereof, at least one of said plates being tiltably fitted in the recess associated therewith and respectively secured to the outer periphery of a corresponding one of said conduction pipes, the other of said plates being each closely fitted in the recess associated therewith and tiltably supporting a respective one of said conduction pipes through said resilient seal members, said conduction pipes providing respective communication between said fixed passages and said communicating passages through the interior of the innermost conduction pipe and the respective annular clearance formed between adjacent inner and outer conduction pipes.

* * * * *